US007275893B2

(12) United States Patent
Rexius et al.

(10) Patent No.: US 7,275,893 B2
(45) Date of Patent: Oct. 2, 2007

(54) APPARATUSES AND METHODS FOR DISPENSING MATERIALS

(75) Inventors: Arlen Rexius, Eugene, OR (US); David Looney, Monroe, OR (US); Jason Wedmore, Eugene, OR (US); Chris Forsman, Eugene, OR (US)

(73) Assignee: Finn Corporation, Fairfield, OH (US)

( * ) Notice: Subject to any disclaimer, the term of this patent is extended or adjusted under 35 U.S.C. 154(b) by 0 days.

(21) Appl. No.: 10/393,189

(22) Filed: Mar. 19, 2003

(65) Prior Publication Data

US 2004/0184889 A1 Sep. 23, 2004

(51) Int. Cl.
*B65G 53/00* (2006.01)

(52) U.S. Cl. ........................................ 406/197; 406/39

(58) Field of Classification Search .................. 406/38, 406/39, 40, 41, 42, 46, 44, 197
See application file for complete search history.

(56) References Cited

U.S. PATENT DOCUMENTS

| | | | |
|---|---|---|---|
| 547,024 A | | 10/1895 | Neale |
| 909,423 A | | 1/1909 | Keller |
| 1,371,451 A | | 3/1921 | Stacy |
| 1,629,315 A | | 5/1927 | Scott |
| 2,063,086 A | | 12/1936 | Gerald |
| 2,201,279 A | | 5/1940 | Willing |
| 2,842,897 A | | 7/1958 | Finn |
| 3,199,679 A | | 8/1965 | Salyer, Jr. |
| 3,220,555 A | | 11/1965 | Silha |
| 3,374,635 A | | 3/1968 | Crandall |
| 3,561,219 A | | 2/1971 | Nishizawa et al. |
| 3,617,566 A | | 11/1971 | Oshima et al. |
| 3,696,623 A | | 10/1972 | Heine et al. |
| 3,847,722 A | | 11/1974 | Kistner |
| 3,871,182 A | | 3/1975 | Estruco |
| 3,876,260 A | * | 4/1975 | Moss et al. .................. 406/29 |
| 3,942,457 A | | 3/1976 | Keyes et al. |
| 3,957,098 A | | 5/1976 | Hepworth et al. |
| 4,005,010 A | | 1/1977 | Lunt |
| 4,353,946 A | | 10/1982 | Bowers |
| 4,497,712 A | | 2/1985 | Cowling |
| 4,524,916 A | | 6/1985 | Keyes et al. |
| 4,635,576 A | | 1/1987 | Bowers |
| 4,655,637 A | | 4/1987 | Vignocchi |
| 4,784,773 A | | 11/1988 | Sandberg |
| 4,788,790 A | | 12/1988 | Zeager |
| 4,808,024 A | | 2/1989 | Haas |
| 4,979,960 A | | 12/1990 | Rexius et al. |
| 5,015,123 A | | 5/1991 | Houck et al. |
| 5,051,028 A | | 9/1991 | Houck et al. |
| 5,082,398 A | | 1/1992 | Subic |
| 5,096,336 A | * | 3/1992 | Merrett et al. ................ 406/39 |
| 5,154,543 A | | 10/1992 | Houck et al. |
| 5,181,804 A | | 1/1993 | Wysong et al. |

(Continued)

*Primary Examiner*—Joe Dillon, Jr.
(74) *Attorney, Agent, or Firm*—Bell, Boyd & Lloyd LLP

(57) ABSTRACT

Apparatuses and methods for the disbursement of relatively heavy materials, such as aggregate or wet compost out of a moveable container are provided. Material is conveyed within the container to a feeder that meters the material into an air stream. The air stream is provided at a relatively high pressure and flowrate with respect to other mobile blowing systems. The air stream carries the material though a hose that is manned by an operator. The operator points the hose towards a desired location for application of the dispersed material.

26 Claims, 13 Drawing Sheets

U.S. PATENT DOCUMENTS

| | | |
|---|---|---|
| 5,188,302 A | 2/1993 | Alvarez |
| 5,299,888 A | 4/1994 | Wysong et al. |
| 5,330,828 A | 7/1994 | Jacobsen, Jr. et al. |
| 5,338,131 A | 8/1994 | Bestmann |
| 5,421,123 A | 6/1995 | Sakate et al. |
| 5,519,985 A | 5/1996 | Dyck et al. |
| 5,556,237 A | 9/1996 | Rexius |
| 5,595,458 A | 1/1997 | Grabhorn |
| 5,725,160 A * | 3/1998 | Harper et al. ............... 239/654 |
| 5,743,674 A | 4/1998 | Healy |
| 6,027,054 A | 2/2000 | Kaye et al. |
| 6,036,406 A | 3/2000 | Rexius |
| 6,109,835 A | 8/2000 | Grabhorn |
| 6,119,377 A | 9/2000 | Rubio |
| 6,247,876 B1 * | 6/2001 | Stephens ..................... 406/39 |
| 6,343,897 B1 * | 2/2002 | Cutler ....................... 406/143 |
| 6,357,971 B1 | 3/2002 | Rexius |
| 6,397,967 B1 | 6/2002 | McIlwraith |
| 6,422,121 B1 | 7/2002 | Wysong |
| 6,425,714 B1 | 7/2002 | Waddell |
| 6,491,479 B1 | 12/2002 | Rexius |
| 2002/0131828 A1 | 9/2002 | Waddell |

\* cited by examiner

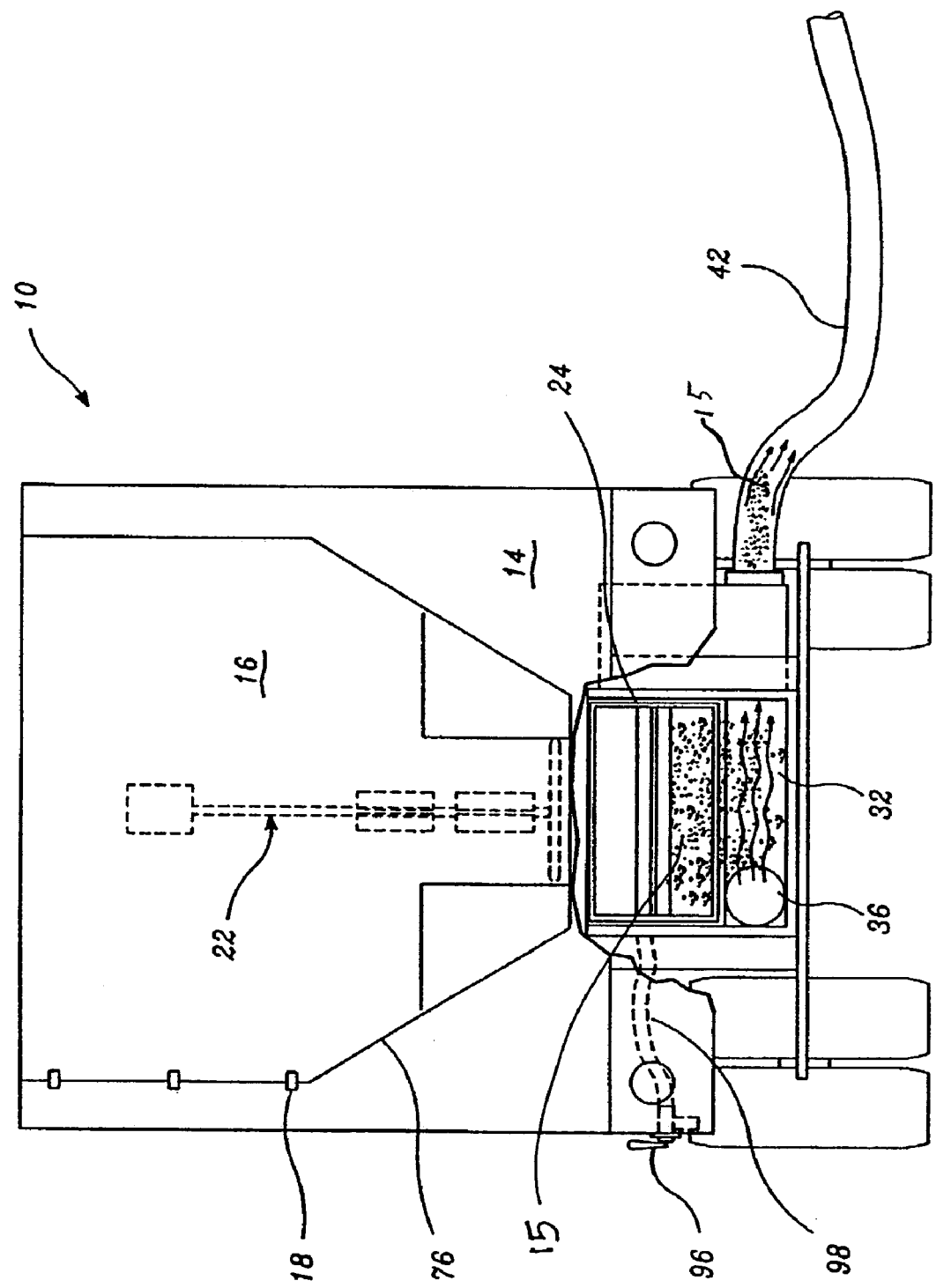

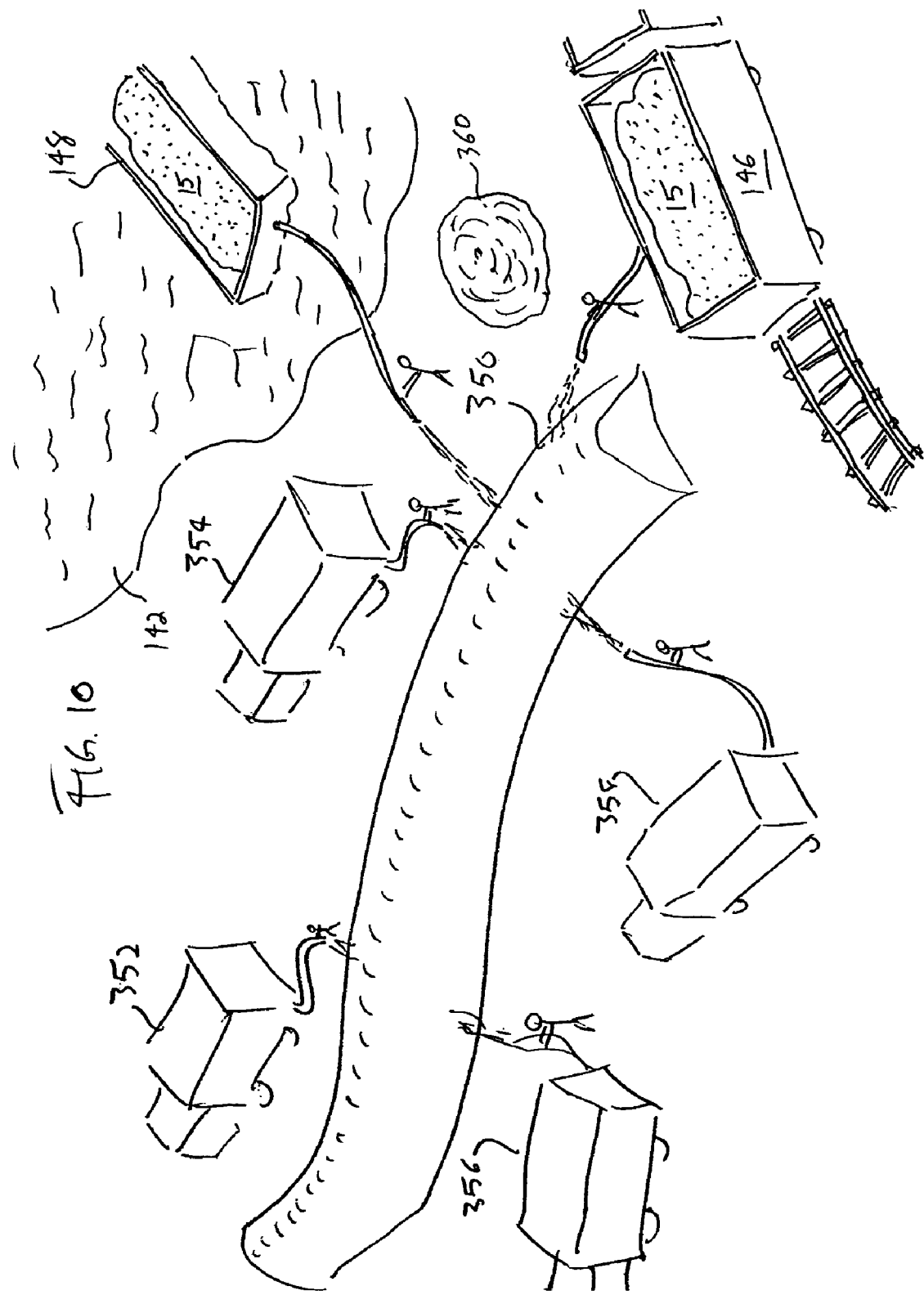

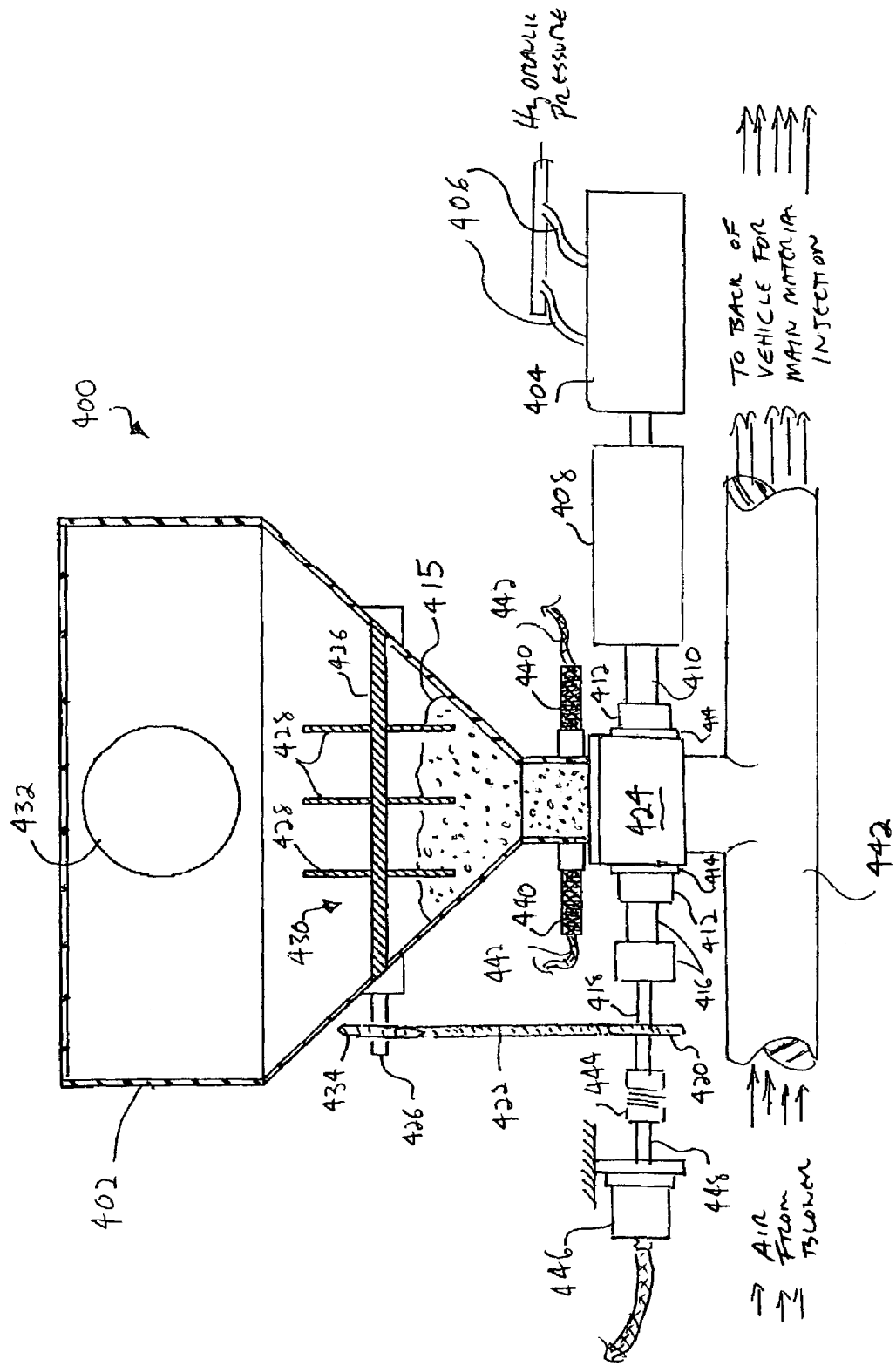

APPARATUSES AND METHODS FOR DISPENSING MATERIALS

BACKGROUND OF THE INVENTION

This invention relates generally to the application of particulate materials and more particularly to the application of landscaping and construction materials.

It is known to pneumatically dispense and distribute certain loose particulate, such as loose bark, wood chips, sawdust and compost. For example, systems exist that allow an operator to man a hose and direct the air and particulate to flow out of the hose and to an application. Uses for such blowing systems include seeding large areas, for example, golf courses and for distributing landscaping materials in commercial and residential applications.

While those systems have achieved commercial success, the present inventors believe that particulate blowing can be expanded into new commercial markets. To that end, a need exists to blow materials other than those listed above. For example, a need exists to blow materials that are heavier or more dense than those described above.

Also, a need exists to blow the above-listed materials, i.e., loose bark, wood chips, sawdust and compost farther and at higher flowrates than has been done before. Those farther distances and higher flowrates should allow pnuematic blowing to achieve greater commercial success in existing markets and in new markets.

Moreover, there is always a need to improve the ability to perform maintenance or reduce the cost associated with such maintenance. Blowing systems involve many moving parts and are subject to relatively substantial loads due to the bulk amount of particulate contained in those systems. Worn parts and parts needing replacement are an inevitability. A need exists therefore to provide access to the parts most likely to need replacement and to reduce the costs associated with same.

Still further, certain materials are mixed with additive when they are blown. One problem with existing additive systems is that the operator does not know when the additive is running low without manually inspecting a feed hopper holding the additive. It is possible that the additive can run out without the operator's knowledge, so that the operator blows a base material without blowing the desired additive. A need therefore exists for a way to conveniently inform the operator when the additive is running low and to preclude the system from blowing only the base material when an additive is desired.

Also, it has been difficult up until now to properly synchronize the additive feed rate when the base material feed rate is adjusted. That problem leads to an uneven amount of additive being blown during an application. A need exists with additive blowing to synchronize the feed rate of the base material with the feed rate of the additive.

SUMMARY OF THE INVENTION

The present invention improves and expands the use of the systems set forth in U.S. Pat. Nos. 5,556,237 and 6,491,479, the teachings of which are incorporated herein by reference. Those patents disclose an apparatus that includes a container for holding and transporting the loose particulate material to the place of application. The container includes a conveyor that conveys the particulate material to one end of the container. That end of the container includes a series of augers and a mixer that feeds the particulate material into a feeder. The feeder meters the particulate material into an air path created by a blower, wherein that air path carries the particulate material through a member or hose manned at one end by an operator. The operator directs the hose to apply the particulate material.

The material dispensing system of the present invention in one embodiment expands the use of the systems set forth in above-mentioned patents. In one embodiment, the dispensing system is used to dispense and apply sand, gravel, rock, crushed rock, rolled rock, stone, rocks of a roughly consistent size, rocks of varying size, rocks of the same color, rocks of different color, porous rock, volcanic rock pieces, riprap rock and any combination thereof (referred to collectively herein as "aggregate"). The system can supply the aggregate in any application requiring same, including but not limited to landscaping and construction applications.

In general, aggregate is heavier than the loose particulate materials that have been blown in the past. Accordingly, a higher capacity blower is used to produce a higher standard flowrate of air (measured typically in cubic feet per minute ("SCFM")) at a higher pressure (measured typically in pounds per square inch gauge (psig)). The present invention is expressly not limited to blowing aggregate and is capable of blowing other materials that have heretofore been too heavy to blow at any appreciable length and in any appreciable quantity, such as wet compost and slag.

The aggregate is applied in one embodiment to landscape residential, commercial and public areas. The aggregate can be blown around trees and bushes, at parks, playgrounds, around schoolyards, around public walkways, in driveways, in parking lots, in roadways, around railroad tracks, on rooftops, etc., and any combination thereof. The aggregate is applied alternatively in residential and commercial construction applications. The aggregate can be sprayed to fill voids created around and within home, road and building foundations, for example.

Another application for the blowing system of the present invention is the application of heavy, organic materials, such as wet compost, wet dirt or other materials having an average density of about 1500 lbs./yard$^3$ or higher.

A further application for the blowing system of the present invention is the application of slag in residential and commercial areas. Slag is generally known as the waste material produced when removing unwanted substances from metals or formed by oxidation at the surface of molten metals. That waste material is used in commercial and residential landscaping applications, for example, to cover driveways. The blower system of the present invention includes a blower capable of blowing and distributing slag over appreciable distances and onto desired areas.

Still another application for the present invention is to blow known materials farther and/or at higher flowrates than have been capable previously. The present invention also sets forth a system that is more powerful than the systems described in the above-mentioned patents, increasing the flowrate and distances achieved for blowing the above-described materials. In particular, the blowers of U.S. Pat. Nos. 5,556,237 and 6,491,479 are powered by the truck engine in one embodiment. While the truck engine provides substantial power, a need exists for a higher horsepower blower. The present invention therefore provides a separate high-powered horsepower generating device in one embodiment that enables even larger aggregates and other relatively dense materials to be dispensed under high pressure and at high flowrates. That high-powered device also enables the system to blow sawdust, loose bark, dry compost and wood chips farther and at larger flowrates than previously possible.

The present invention improves the apparatuses set forth in U.S. Pat. Nos. 5,556,237 and 6,491,479 in other respects. One problem experienced by the blowing system of the present invention is the maintenance of certain parts of the system that are placed under constant strenuous loading. One such part is the feeder. As discussed below, the feeder receives material from a conveyor belt. At the end of the belt, above the feeder, a pair of augers and a mixer stir the material immediately prior to its entry into the feeder. The material is gravity fed into the feeder and is also press fed by the spiraling ramps of the augers.

The weight of the material and the pressure from the augers places stress on the feeder and in particular the rotor and blades of the feeder. Additionally, the inner walls (wear plates and barrel sides) of the feeder are subjected to the pressurized material and can become damaged.

Because only a portion of feeder may become worn, such as the rotor only, one or more of the wear plates or one or more of the barrel sides, it is desirable to replace only the worn portion. In particular, depending on the direction of rotation of the rotor within the feeder body, one barrel side tends to wear more quickly than the other. The feeder of the present invention is mounted inside the bulk container such that it may be readily removed therefrom. The feeder is also bolted together in such a way that the feeder readily disassembles via the removal of such bolts, so that individual worn pieces may be replaced or rebuilt while unworn pieces continue to be used.

The system of the present invention also provides an apparatus and method for synchronizing the main material feeder with one or more additive feeders. To that end, an electrical signal corresponding to the rotational velocity of the additive feeder shaft is sent to a controller that controls the rotational velocity of the main feeder shaft using that signal. Still further, the system provides an apparatus and method for shutting down the feeders when the hopper supplying additive to the additive feeder runs low on additive.

It is therefore an advantage of the present invention to provide an apparatus and method for the pneumatic disbursement of aggregate.

It is another advantage of the present invention to provide an apparatus and method for the pneumatic disbursement of relatively heavy organic materials, such as wet compost.

It is a further advantage of the present invention to provide an apparatus and method for the pneumatic disbursement of slag.

It is also an advantage of the present invention to provide new methods of generating revenue in landscaping and construction applications via the pneumatic application of the previously indicated materials.

Further, it is an advantage of the present invention to blow particulate matter at high flowrates and/or high pressures.

Another advantage of the present invention is to blow relatively high density particulate matter at relatively high flowrates and over a relatively long distance.

It is a further advantage of the present invention to provide an apparatus and method to pneumatically build a berm.

Still further, it is an advantage of the present invention to enable a single person to safely disperse particulate materials under relatively high pressure.

Moreover, it is an advantage of the present invention to disperse aggregate, dirt, slag and wet compost with a limited formation of dust from those particulate materials.

Yet another advantage of the present invention is to reduce maintenance costs for the blower system.

Yet a further advantage of the present invention is to provide a pneumatic blowing system that employs a feeder that is readily taken apart and rebuilt.

Still a further advantage of the present invention is to accurately synchronize the rotational velocity of a main particulate feeder with the rotational velocity of an additive feeder.

Still another advantage of the present invention is to provide an apparatus and method for shutting down the system when an additive hopper is running low on additive.

Additional features and advantages of the present invention are described in, and will be apparent from, the following Detailed Description of the Invention and the figures.

BRIEF DESCRIPTION OF THE FIGURES

FIG. 6 is a rear, partial cutaway view of the container truck illustrating the blower and feeder mechanism.

FIG. 10 is a perspective view of one application for the pneumatic dispersion apparatuses and methods of the present invention.

FIG. 11 is an elevation view of one embodiment of a seed injection system of the present invention providing feeder speed feedback and a low-feed shutdown feature.

DETAILED DESCRIPTION OF THE INVENTION

Figure 1:
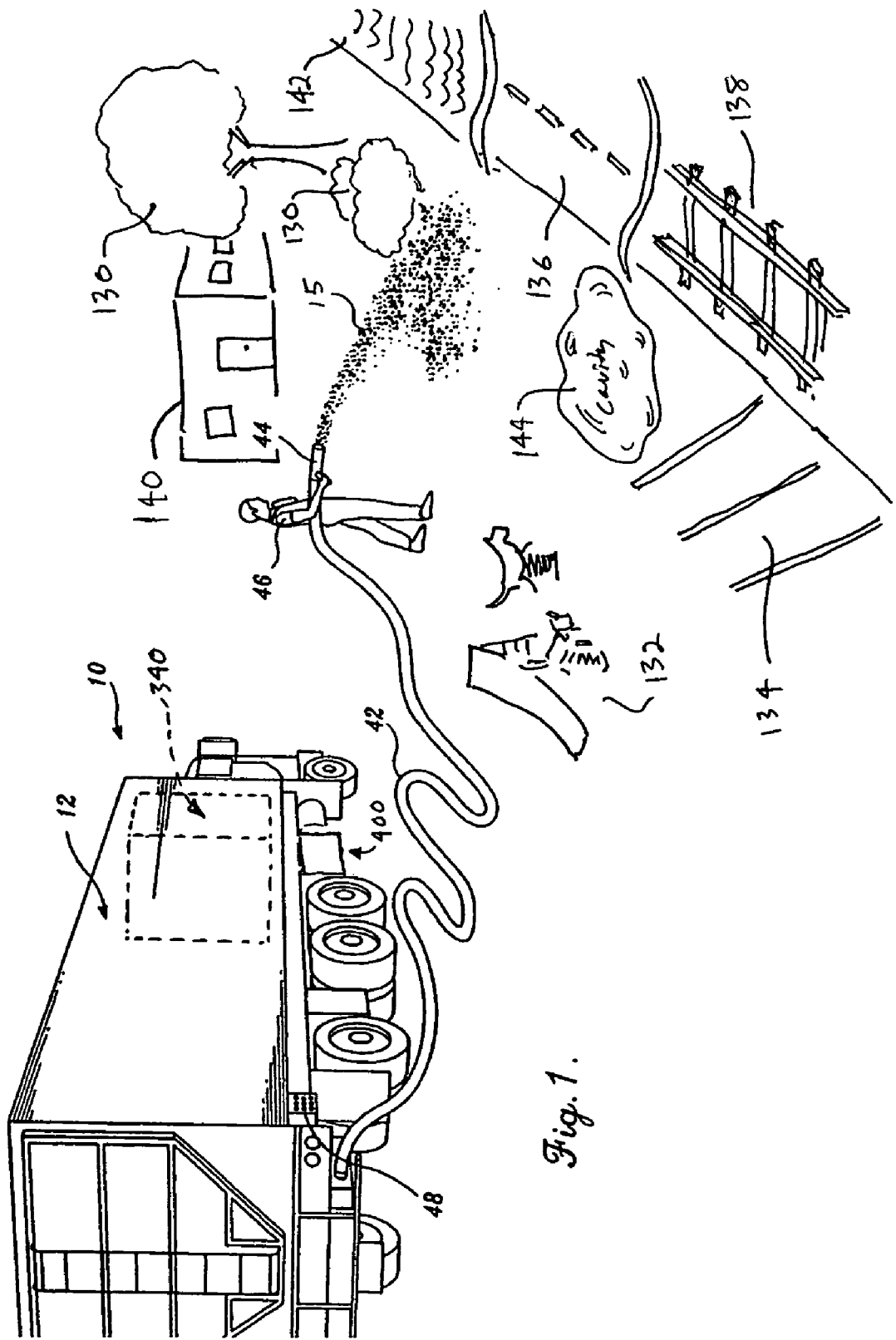
FIG. 1 is a perspective view of a container truck, attached hose and operator distributing loose particulate material in accordance with one embodiment of the present invention.

Referring now to the drawings and in particular to FIGS. 1 and 10, the present invention provides new applications for dispersing materials in residential, commercial and public areas. In particular, apparatuses and methods for pneumatically blowing aggregate, raw dirt, slag and wet compost are provided. Those materials can be blown around trees and bushes 130, at parks 132, playgrounds 132, around schoolyards 132, around public walkways 134, in driveways 134, in parking lots 134, in roadways 136, around railroad tracks 138, on rooftops 140, waterways 142, etc., and any combination thereof. Those materials may be applied in residential or commercial landscaping or construction applications. The aggregate may be blown to fill voids 144, to provide a firm base, or to build mounds 360. Various materials such as aggregate or the dirt can be blown to build berms 350, for instance, between busy roads and houses or to separate a commercial area from a residential area or from another commercial area.

The new applications also create a new source of revenue for landscaping and construction contractors. The revenue is generated based on one or more of the following non-inclusive factors: (i) the amount of material applied; (ii) the particular application, e.g., large commercial account could get pricing discount; or (iii) the distance that the bulk container, e.g., within a mobile truck tractor or other type of vehicle, must travel to reach the use destination.

As used herein, the term "material" specified below by the number 15 refers to aggregate as that term is defined herein, raw dirt, slag, wet compost and to any other dispersible material having an average density of about 1500 lbs./yard$^3$ to 3000 lbs./yard$^3$. "Aggregate" includes components that are similarly sized or variously sized. "Aggregate" also includes inorganic substances of any size from the smallest sand particles up to rock having a maximum dimension of three inches.

"Slag" as referred to herein is produced by steel mills, coal mines and other places that produce waste materials due to a chemical reaction with or to the oxidation of metals. That metal slag is heavy relative to wood chips, dry compost, sawdust and bark and requires a more powerful blower than has been built previously. "Wet compost" as used herein refers to compost having a water content of at least fifty-five percent by weight.

As seen in FIG. 1, a container truck 10 including a dispensing and distributing apparatus formed in accordance with the present invention is illustrated. The container truck includes a trailer or material container 12. The container 12 may be part of the truck 10 or it may be a detachable trailer. While a truck is one preferred device for transporting the container 12 and bulk material 15, the present invention is not so limited. Truck 10 is alternatively any other suitable type of gas or electrically powered vehicle, railroad car 146, a boat 148 or any other suitable device for transporting container 12 and material 15. For ease of description, the term "truck" is used herein when referring to element number 10.

Figure 2:
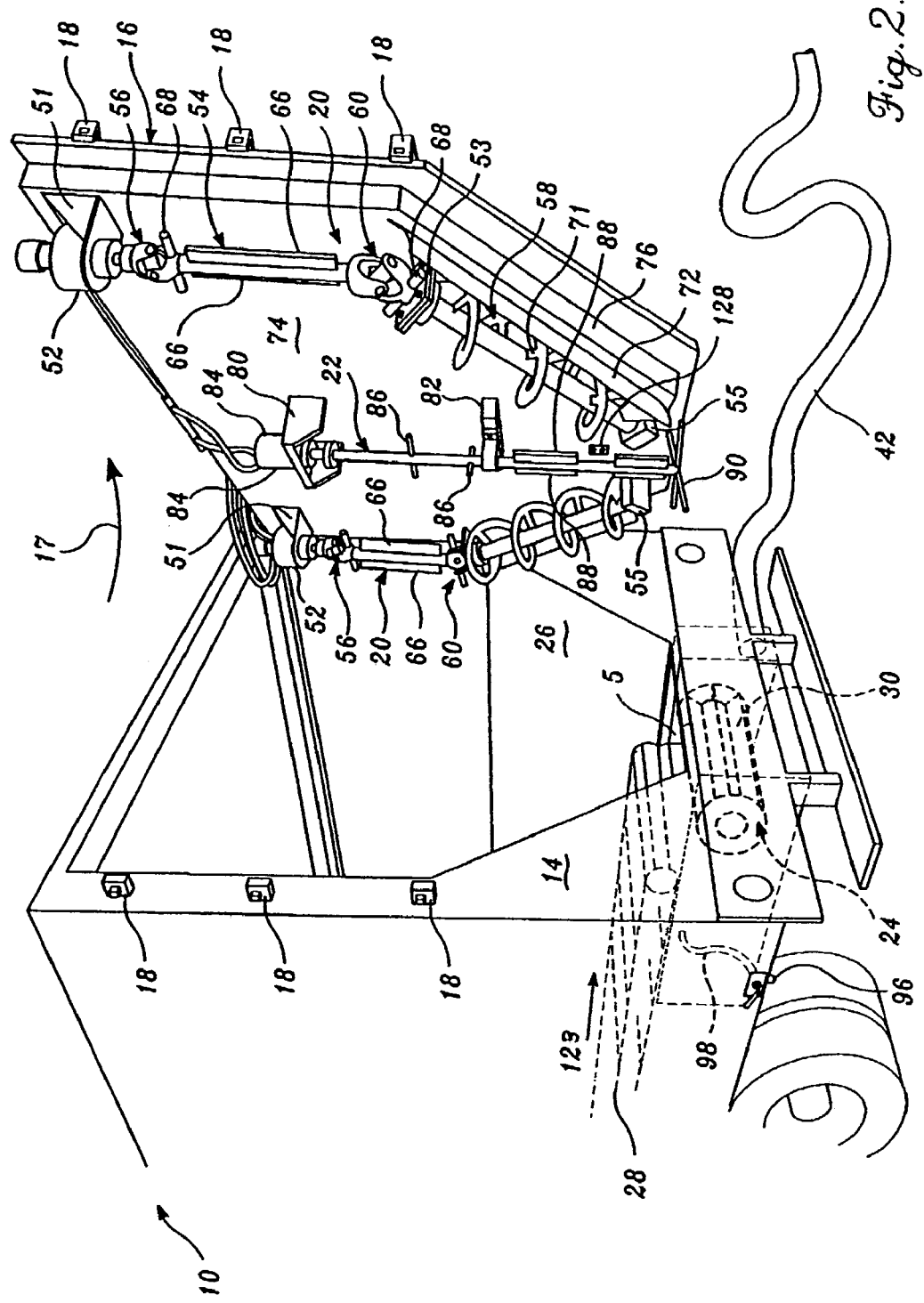
FIG. 2 is a fragmentary perspective view of the rear portion of the container truck of FIG. 1 illustrating the augers, mixer and feeder.

The container 12 is preferably a five-sided box having an open top or roof through which material 15 is loaded using a front-end loader or other appropriate loading equipment. The container 12 includes a door 16 that takes up a large portion of the rear wall 14 of the truck. The door 16 is hinged on one side so that it may swing open in an arc away from the rear wall of the truck as shown by arrow 17 (FIG. 2). The opposite side of the door 16 is releasably fastened to the rear of the truck using a plurality of locking fasteners 18. In an alternative embodiment, door 16 hinges along the top of truck 10 and opens via hydraulic cylinders.

Two opposing augers 20 and a centrally located mixer 22 are rotatably mounted on the inner surface 74 of the door 16. A cylindrical feeder 24 is rotatably mounted beneath an inclined floor 26 of the container 12 directly beneath the mixer 22. When the door 16 is closed and locked, the augers 20 and mixer 22 are positioned to feed loose particulate material within the container 12 into the cylindrical feeder 24. The loose particulate material within the container 12 is also fed to the feeder 24, augers 20 and mixer 22 by a moving floor or conveyor 28 located at the bottom of the floor 26.

The feeder 24 includes a plurality of radially extending longitudinal walls forming individual divided chambers 30 spaced around its circumference (FIGS. 2 and 5). As the feeder rotates, the chambers 30 drop a predetermined quantity of loose particulate material from the container 12 into the top of a mixing chamber 32 (FIGS. 5 and 6) located directly beneath the feeder 24. One side of the mixing chamber 32 is connected to a blower 34 by ducting 36 while the opposite side is connected to a member or hose 42 ("member" includes any directional device and is not limited to a hose).

As described in detail below, during operation, the blower 34 forces a large volume of high velocity air through the ducting 36. As the air flows through the ducting 36, water is preferably injected into the air stream through a water nozzle 40 extending into the air stream. The water atomizes upon contact with the air stream, forming a mist. The resulting moist air stream enters one side of the cavity 32, and mixes with material 15 dropped into the top of the cavity 32 by the feeder 24. The combined stream of air, water and material 15 exits the chamber 32 through a hose 42 connected to the opposite side of the chamber (FIG. 6). The material 15 is blown through the length of the hose 42 and exits at a free end 44 that is manipulated by an operator 46 (FIG. 1). Upon exiting the hose 42, the material 15 settles upon the location or destination at which the operator 46 points the free end 44 of the hose.

With respect to wet compost, material 15 refers collectively to the dry components that make up the wet compost as well as the wet compost itself, which contains fifty-five percent by weight of water. The distinction is important because in one embodiment, the wet compost is created by mixing the dry compost materials 15 with water at the use site. In another embodiment, wet compost is pre-made and transported in via container 10 as a completed material 15 that is distributed without adding additional water through nozzle 40.

The operator 46 controls the flow of material 15 through the hose 42 using either a local control panel 48 (FIG. 1) mounted on the side of the container 12 or a remote transmitter control panel 50. Both control panels 48 and 50 allow the operator to control the speed of the blower 34 and feeder 24 to increase or decrease the volume of material 15 being applied.

The individual parts and operation of the present invention will now be discussed in greater detail. As discussed above, the interior of the container 12 is filled by loading material 15 into the top of the container using a front-end loader or other loading equipment. As the material 15 is dispensed from the rear of the container, additional material 15 is transported from the front of the container to the rear of the container by the moving floor.

As best seen in FIG. 2, the moving floor or conveyor 28 is mounted on the floor of the container centered between the inclined sides of the floor 26, commonly referred to as a V-bottom container. The inclined sides of the floor 26 slope upward from the opposing edges of the moving floor 28 until they contact the vertical sides of the container. The rear end of the moving floor terminates adjacent the forward edge of an opening 57 in the floor of the container.

Figure 9:
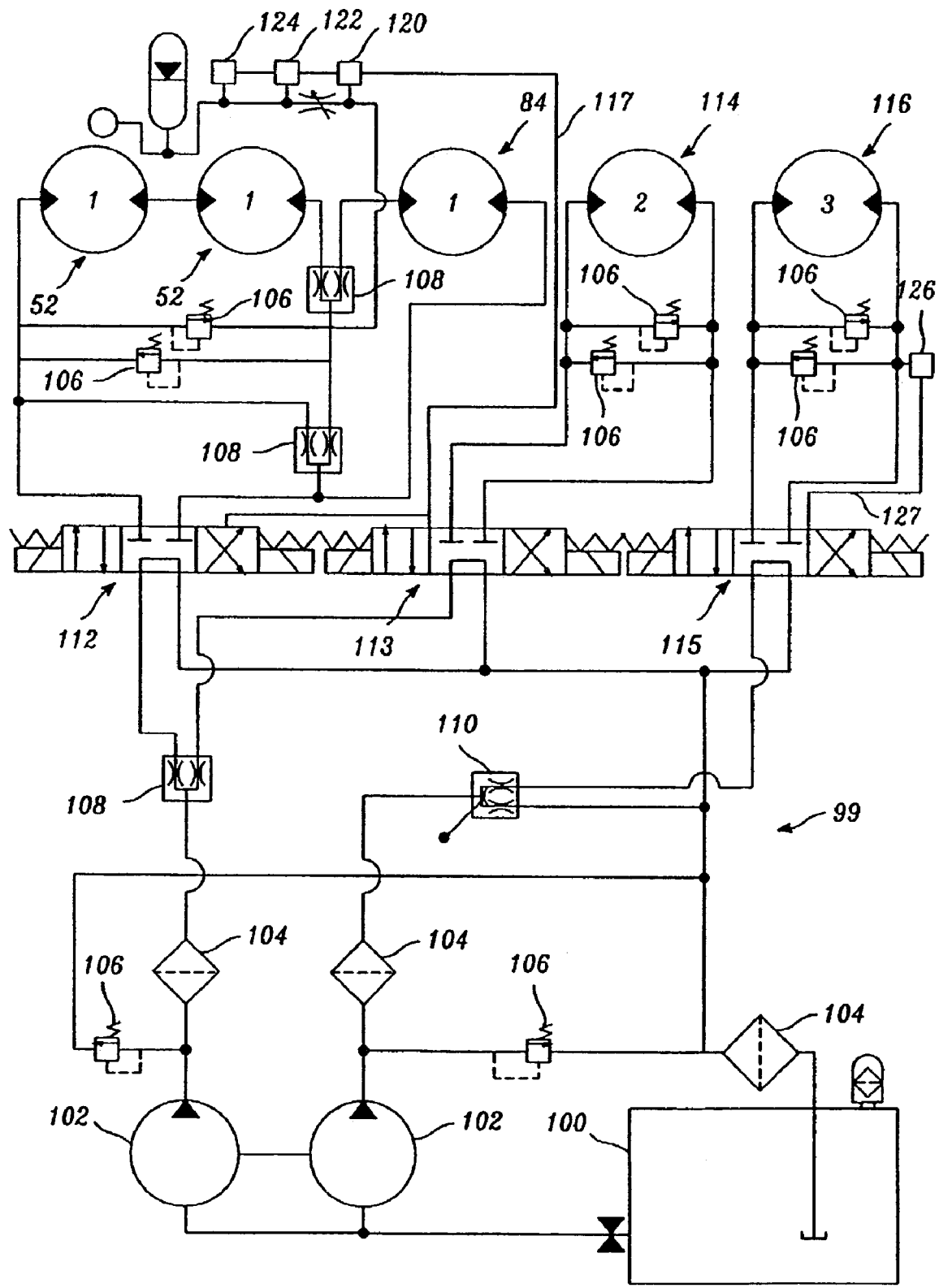
FIG. 9 is a hydraulic schematic of the hydraulic control system of the container truck of FIG. 1.

The moving floor or conveyor 28 moves the load of particulate matter within the container forward or rearward within the container in response to a hydraulic control system 99 (FIG. 9). The moving floor 28 is made using overlapping belt sections for various ones of the materials. For other materials, such as aggregate, moving floor 28 is solid and continuous. Floor 28 may also use a mesh belt for aggregate if the mesh size is safely smaller than the smallest aggregate size.

The moving floor's movement is controlled by a hydraulic control system 99 (FIG. 9) as described below. The moving floor 28 may be started or stopped using either of the local or remote control panels 48 and 50. The moving floor's movement may also be controlled automatically by a hydraulic or electric load sensing system as discussed below.

When material 15 transported by the moving floor 28 reaches the rear end of the moving floor 28 it is moved into contact with the opposing augers 20 and mixer 22 (FIG. 2). Each auger 20 is rotatably attached to the inner surface 74 of the door 16 by an upper bracket 51, a central bracket 53, and a lower bracket 55. Each auger 20 is rotatably driven by a hydraulic motor 52 that is attached to the upper bracket 51. Each hydraulic motor 52 rotates the augers in response to inputs from the hydraulic control system (FIG. 9). The preferred embodiment rotates the augers between seven and twenty RPMs; however, other speeds could be used, depending upon the application.

Each hydraulic motor 52 is attached to a straight shaft 54 of the respective auger by a first universal joint 56 (FIG. 2). Each straight shaft 54 extends downward from the hydraulic motor 52 parallel to the edge of the door 16. The opposite end of each straight shaft 54 is attached to an inclined shaft 58 by a second universal joint 60. The inclined shaft 58 extends downward parallel to the inclined edge 76 of the door 16. The upper and lower ends of the inclined shaft 58 are rotatably mounted to the inner surface 74 of the door using bearings in the L-shaped central bracket 53 and the lower bracket 55, respectively.

Figure 3:
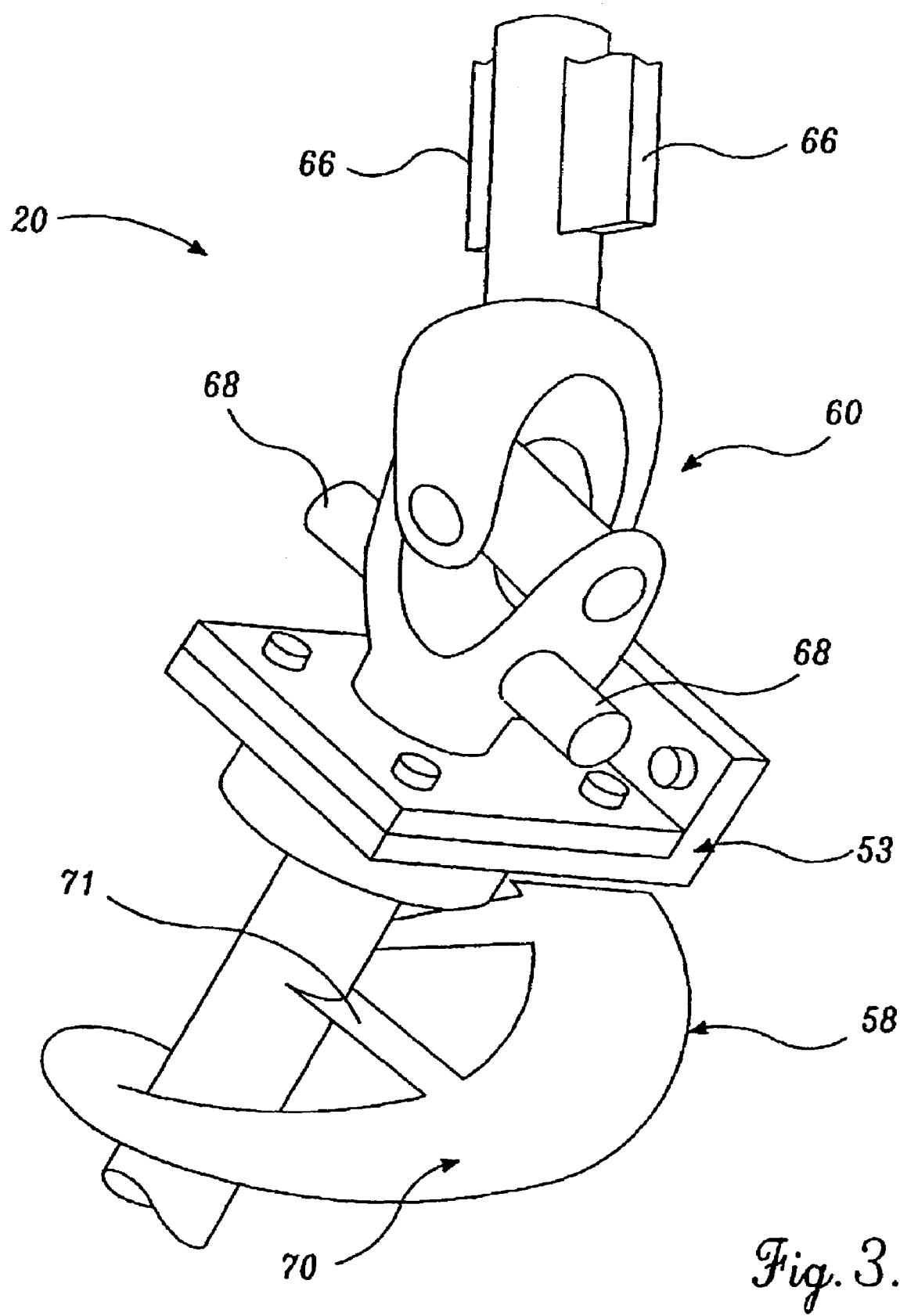
FIG. 3 is an enlarged, perspective view of a portion of one of the augers of FIG. 2.

The augers 20 are used to break up and feed material 15 within the container to the mixer 22 and feeder 24. To assist in breaking up material 15, each straight shaft 54 includes two opposing radially extending paddles 66. In addition, both universal joints 56 and 60 include radially extending opposing rods 68 (FIGS. 2 and 3).

Figure 4:
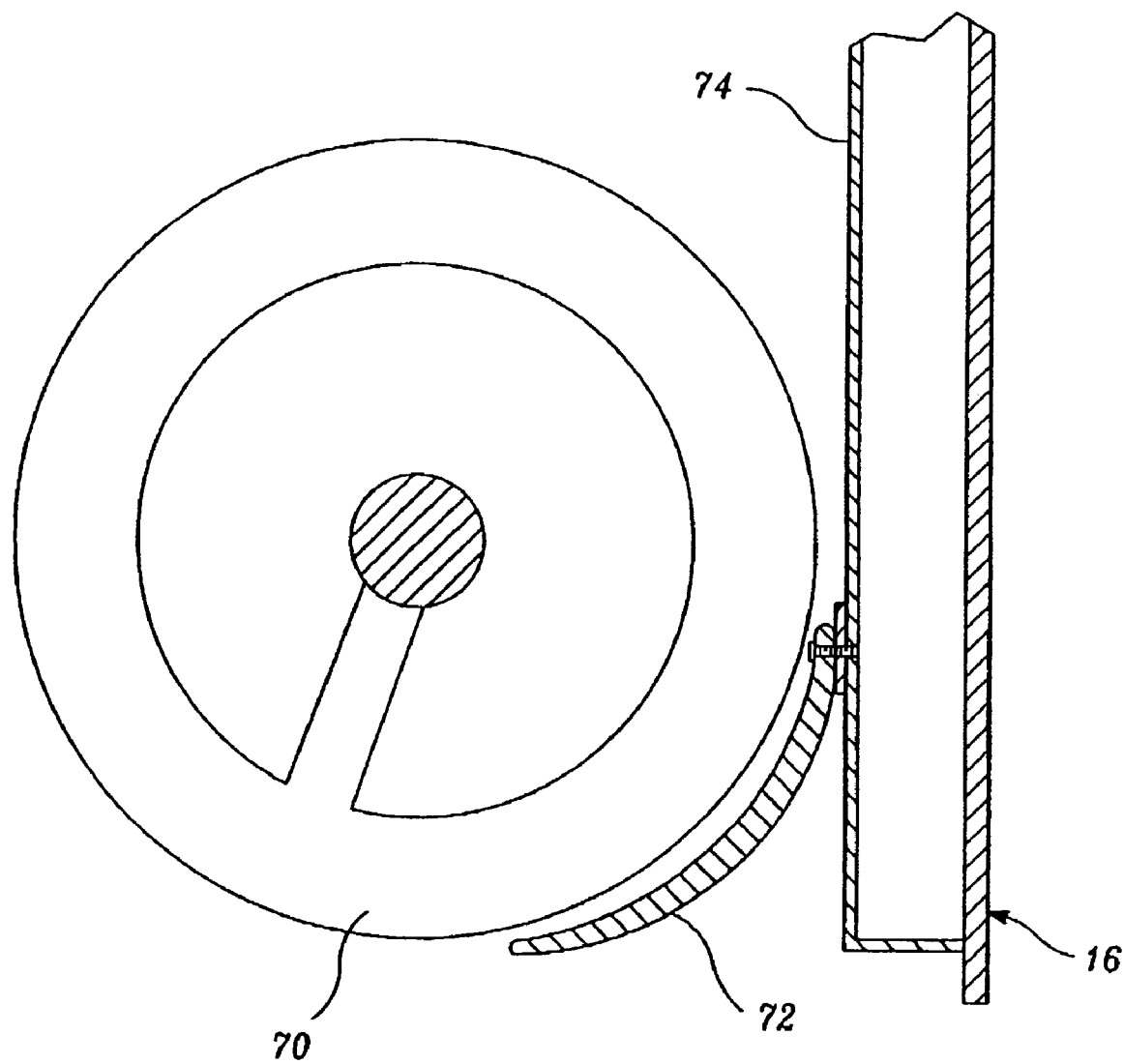
FIG. 4 is a cross section of the lower section of one of the augers of FIG. 2.

Each inclined shaft 58 includes a ramp 70 (FIG. 3) that spirals downward over the length of the shaft. Each ramp 70 is spaced radially outward from the surface of the shaft 58 by a plurality of radial arms 71. As the augers 20 rotate, the ramps 70 carry material 15 downward along the inclined floor 26 into the opening 54. Preferably, flange 72 (FIGS. 2 and 4) is mounted outboard of the ramp 70 parallel to the inclined edge 76 to prevent material 15 from being forced into gaps between the edge of the door 16 and the rear wall 14 of the container. The flange 72 is bolted or otherwise fastened to the inner surface 74 and curves outward approximately parallel to the cylindrical surface established by the circumference of the ramp 70.

As material 15 is fed into the opening 54, it passes through the mixer 22. The mixer 22 is centered between the two augers 20 and rotatably attached to the inner surface of the door 16 by bearings located at its upper end in a bracket 80 and at its mid-span in a bracket 82. The mixer 22 is rotatably driven by a hydraulic motor 84 attached to its upper end. The hydraulic motor 84 rotates the mixer 22 in response to inputs from a hydraulic control system 99 (FIG. 9). A plurality of rods 86 (FIG. 2) and paddles 88 extend radially outward from the center of the mixer 22 to assist in breaking up loose particulate material within the container 12. The lower end of the mixer 22 terminates at two perpendicular, radially extending mixing rods 90. The mixing rods 90 are located directly above the opening 54 in the floor when the door 16 is closed and fastened.

As material 15 is moved rearward by the moving floor 28, it is broken up or separate and directed into the mixing rods 90 by the augers 20 and moving floor 28. The mixing rods 90 help to break up, loosen and separate material 15 as it is forced through the opening 54 by the augers, thus avoiding "bridging" of the fill material over the opening of the feeder. The broken up material 15 is funneled downward into the individual chambers 30 of the feeder 24 by ducting 92.

The ducting 92 is sized to feed material 15 into the chambers 30 while preventing loose particulate material from falling between the feeder 24 and the ducting into the mixing chamber 32. The ducting 92 and feeder 24 form an airlock between the mixing chamber 32 and the interior of the container 12. The airlock prevents air being blown through the mixing chamber 32 from blowing upward through the feeder and into the interior of the container.

The feeder 24 is rotatably mounted within the ducting 92 and is driven by a hydraulic motor (not shown) controlled by the hydraulic control system 99 (FIG. 9). As the feeder 24 is rotated, material 15 within each chamber 30 is rotated downward until it falls into the top of the mixing chamber 32 (FIGS. 5 and 6). As the feeder 24 feeds material 15 into the top of the mixing chamber 32, the blower 34 forces a high speed stream of air into one side of the mixing chamber through ducting 36.

Figure 5A:
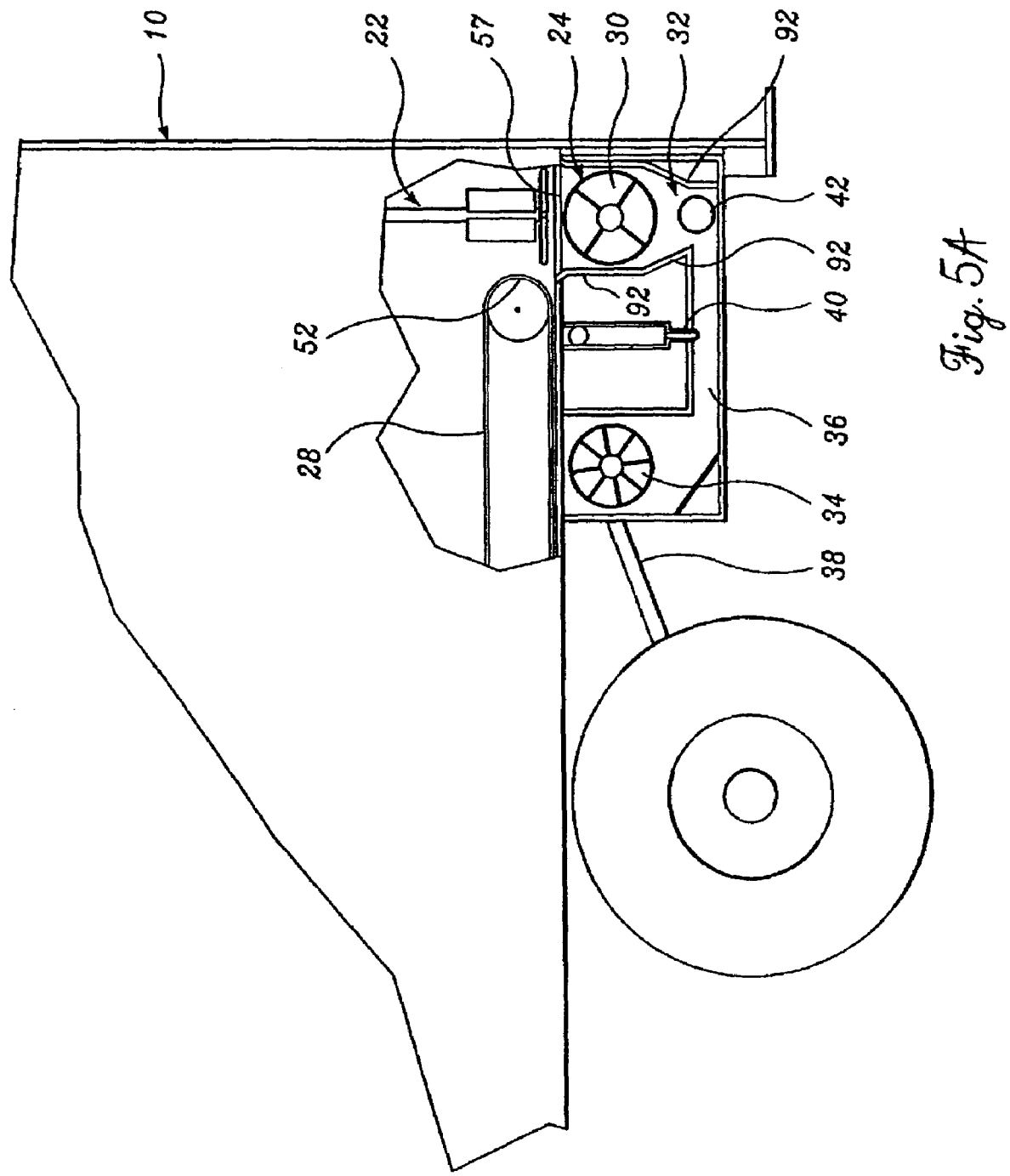
FIG. 5A is a side, partial cutaway view of the container truck illustrating the blower and feeder mechanism.

The blower 34 may be any type of blower capable of producing high speed air flow. The blower 34 may be driven by a power takeoff 38 from the truck engine or may be driven by a remote mounted engine 340 (FIG. 1) discussed below. As the blower provides a high speed air stream through the ducting 36, in a preferred embodiment water is introduced into the air stream by the water nozzle 40 (FIG. 5A). The water nozzle 40 is connected to an external water valve 96 (FIG. 2) by a hose 98.

Figure 5B:
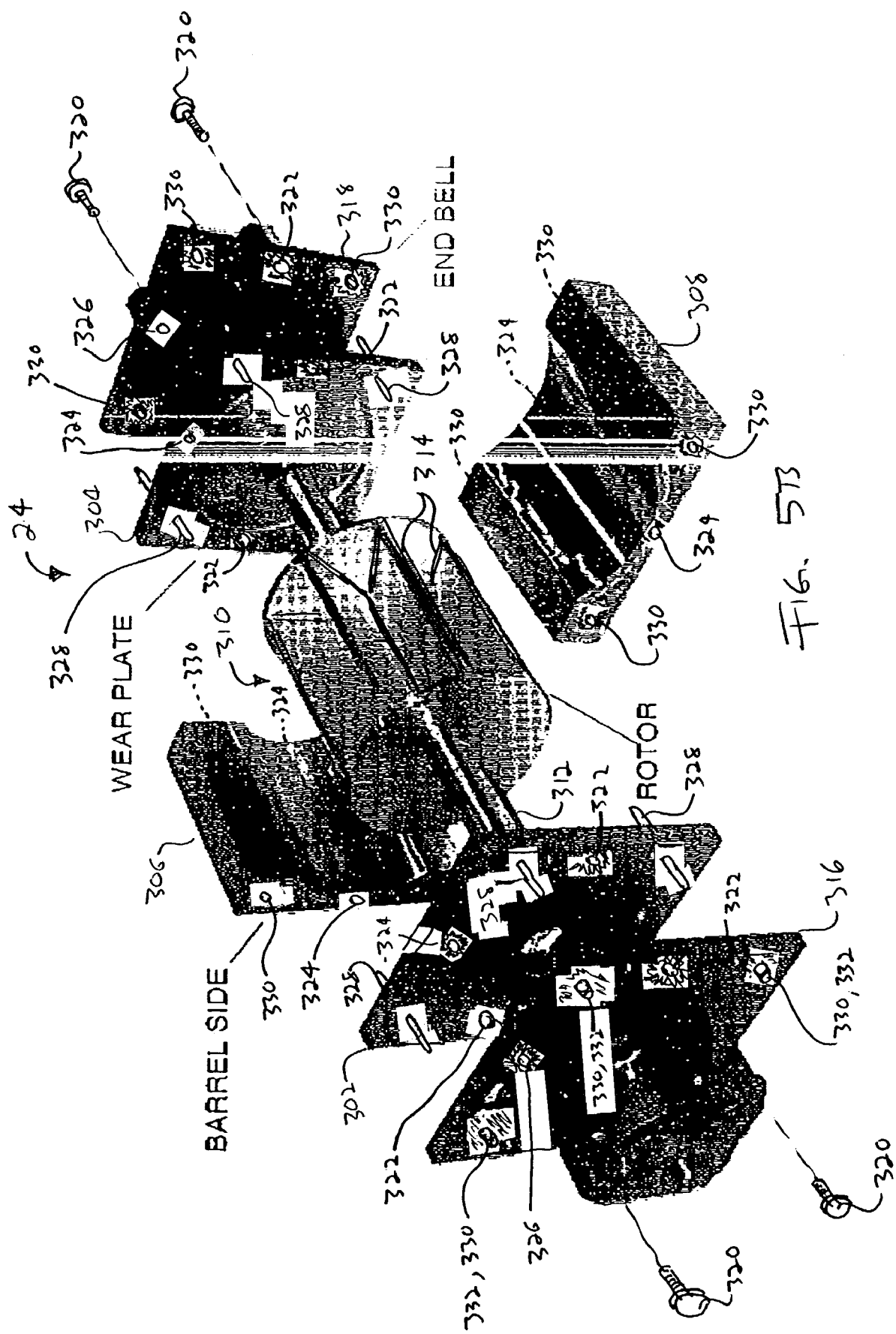
FIG. 5B is an exploded perspective view of one embodiment of the replaceable component airlock feeder blower of the present invention.

Referring now to FIG. 5B, one preferred embodiment for the feeder 24 of the present invention is illustrated in an exploded format. Feeder 24 includes a body that is made up of a pair of wear plates 302 and 304 and a pair of barrel sides 306 and 308. The wear plates and barrel sides define a chamber in which a rotor 310 is housed. The barrel sides 306 and 308 define an interior surface having substantially the same radius as defined by the shaft 312 and blades 314 of the rotor 310. The top and bottom of the feeder 24 are open to allow material 15 to enter and exit the feeder 24.

The blades 314 therefore come very close to touching the inner surface of the barrel sides 306 and 308, which prevents virtually any air from the blower 34 mounted below (i.e., on the output side) the feeder 24 from traveling though feeder 24 to the inlet side of same. For example, there is approximately a 0.007 inch clearance between the outer edges of blades 314 and an inner surface of the barrel sides 306 and 308 in one embodiment. That tight clearance tends to disallow pressure from escaping through the feeder 21. To complete the airtight arrangement, the body of feeder 24 mounts sealingly to the inside walls of the mixing chamber 32 so that air cannot escape around the outside of the mixer 24.

End plates 316 and 318 mount outside of wear plates 302 and 304. End plates 316 and 318 include the bearings and packing glands to seal the plates to shaft 312. In one embodiment, plates 316 and 318 employ tapered roller bearings to provide proper shaft alignment and allow for higher load ratings.

As illustrated by FIG. 5B, the removal of a number of bolts 320 enables any of the constituent components of the housing, rotor 310 or the end plates 316, 318 to be separated, removed and replaced or rebuilt, while allowing the remainder of the components to remain in use. Bolts 320 extend through side holes 322 defined by the end plates 316, 318 and wear plates 302 and 304 and thread into threaded holes 324 defined by the barrel sides 306, 308. Bolts 320 also extend through top holes 326 defined by the end plates 316, 318 and thread into threaded holes 324 defined by wear plates 302, 304. The barrel plates 306, 308, wear plates 302, 304 and end plates 316, 318 are also held together by a series of pins 328 attached through wear plates 302, 304 that extend into clearance apertures 330 defined by end plates 316, 318 and barrel plates 306, 308 when the pieces are assembled. Dowels 332 can also be provided that extend from end plates 316, 318 and are disposed around apertures 330.

Pins 328, apertures 330 and dowels 332 have tight tolerances and hold the components of feeder 24 loosely but snugly in place, allowing bolts 320 to be removed and inserted easily. Once bolts 320 are removed, the components slide completely apart. If the blades 314 become worn ("worn" includes bending, breaking, tearing, corroding and any other mechanical, chemical or electrochemical deformity that could cause a part to have to be replaced), the blades 314 can be removed from the shaft 312 and replaced or rebuilt. The piecemeal reconstruction of the feeder 24, one of the components of the system that is most likely to wear, reduces the cost of maintenance and extends the life of the components of the feeder appreciably.

In particular, depending on the direction of rotation of the rotor 310 within the body of feeder 24, one barrel side 306, 308 will wear more quickly than the other barrel side 306, 308, requiring one side 306, 308 to be replaced, e.g., two to five times more often than the other side 306, 308. Such wear can corrupt the tight clearance described above so that pressure is lost inside mixing chamber 32, reducing overall system performance. The feeder 24 is readily disassembled to allow the worn barrel side 306, 308 to be replaced.

As seen in FIG. 2, during operation, the water valve 96 is connected to a water supply through the use of a hose (not shown). The water flows through the water valve 96, hose 98 and nozzle 40 into the air stream produced by the blower 34. As the water exits the nozzle 40, it is atomized by the air stream flowing through the ducting 36, producing a mist. The resulting water laden air stream flows into one side of the mixing chamber 32 (FIGS. 5 and 6). As the air stream enters the mixing chamber, it mixes with the material 15 entering the top of the mixing chamber (as stated before, material 15 refers to materials prior to and after mixing with water). The water within the air stream mixes with the material 15 reducing the amount of loose dust or particles produced by the high velocity air stream contacting the material 15. The material 15 is then blown out the opposite side of the mixing chamber 32 into the hose 42 (FIG. 6). The air stream produced by the blower blows the material 15 through the length of the hose 42 until it exits the free end 44 (FIG. 1). As illustrated in FIG. 1, an operator 46 may manipulate the free end 44 of the hose in order to place material 15 wherever desired.

Figure 7:
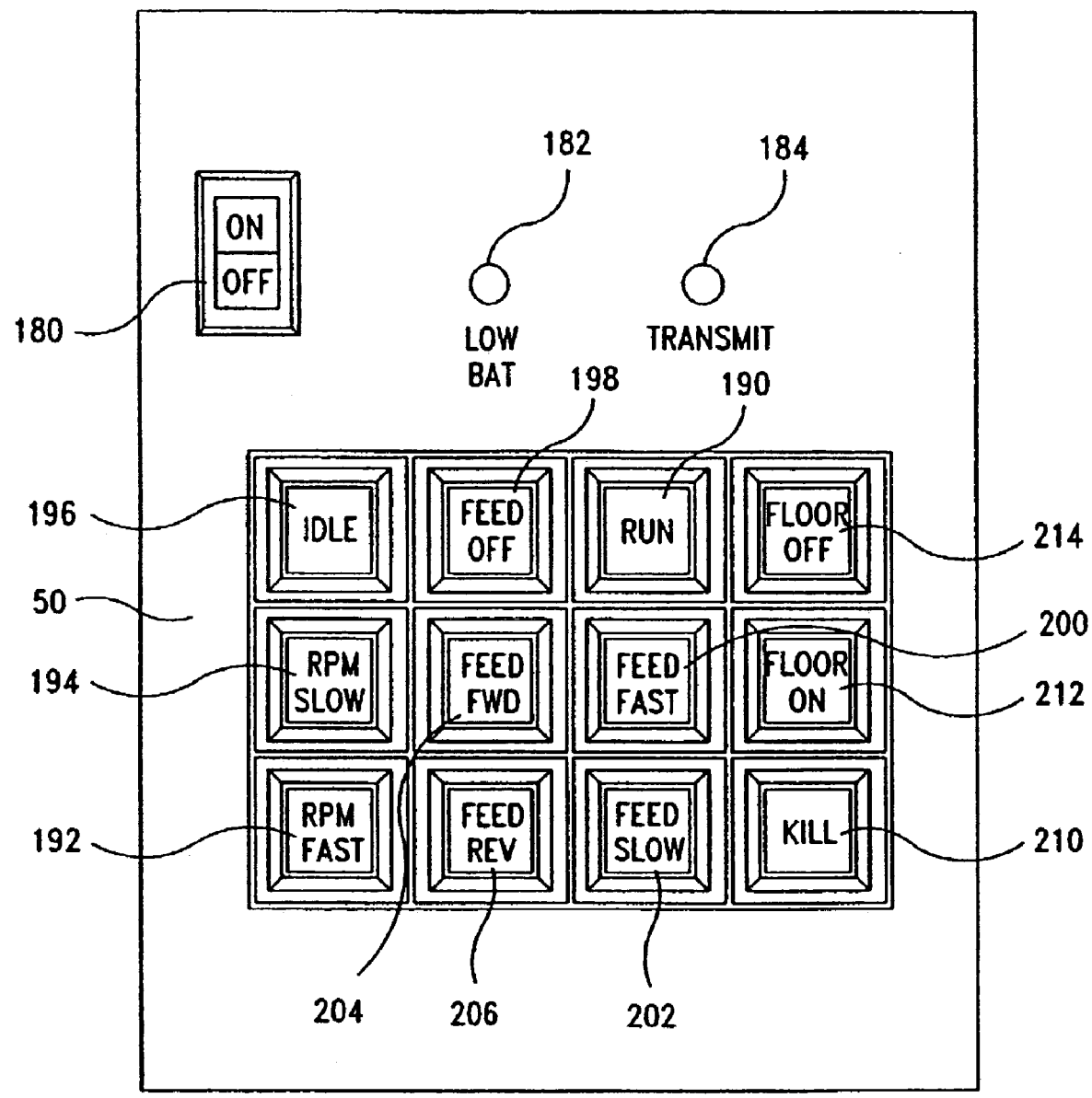
FIG. 7 illustrates one embodiment for the remote transmitter of the present invention that controls the blower and feeder mechanism.

The operation of the container truck is controlled by the operator using either the local control panel 48 (FIG. 8A) or the remote transmitter control panel 50 (FIG. 7). Using the control panels 48 or 50, the operator may control the operation of the truck hydraulic control system 99 illustrated in FIG. 9. The hydraulic control system 99 includes a central hydraulic fluid reservoir 100, two fluid pumps 102, appropriate high pressure filters 104, constant pressure valves 106, flow dividers 108, and flow control valves 110, 112, 113, and 115 as illustrated in FIG. 9 and as understood by those of ordinary skill in the art. The hydraulic control system controls the operation of the hydraulic motors 52 (FIGS. 2 and 9) operating the augers 20 and the hydraulic motor 84 operating the mixer 22. The hydraulic control system also controls the hydraulic motor 114 that operates the moving floor 28 and the hydraulic control motor 116 that operates the feeder 24.

The hydraulic control system includes a first pressure sensor 120, a second pressure sensor 122, and a third pressure sensor 124. The sensors 120, 122 and 124 are electrically hard wired into the control valves 112 and 113 that control the operation of the motor driving the moving floor 28, augers 20, and mixer 22 by wiring 117. The first pressure switch 120 senses when there is a low hydraulic pressure in the hydraulic control loop driving the augers 20 and mixer 22. Such a low hydraulic pressure is present when the augers 20 and mixer 22 are free-wheeling or moving only a small quantity of loose particulate material within the container. Under such circumstances, the low pressure sensor 120 sends a signal to the control valve 113, instructing the valve to open, thus starting the hydraulic motor 114. When the hydraulic motor 114 starts, the moving floor 28 moves clockwise as illustrated by arrow 122 (FIG. 2). This moves additional material 15 within the container into contact with the augers 20 and mixer 22.

As material 15 moves into contact with the augers 20 and mixer 22, resistance to the movement of the augers and mixer increases, thus increasing the hydraulic pressure in the system driving the motors 52 and 84. When the hydraulic pressure reaches a predetermined level, the second pressure sensor 122 is triggered. Triggering the second pressure switch 122 provides a signal to the control valve 113 instructing the valve to close, thus stopping the movement of the moving floor 28.

If too large a quantity of material 15 is provided to the augers 20 and mixer 22 it is possible that the augers or mixer could jam. In such circumstances, a sufficiently large hydraulic pressure is developed within the hydraulic system to trigger the third pressure sensor 124. Triggering the third pressure sensor 124 sends a signal to the control valve 112 instructing it to reverse the direction of movement of the hydraulic motors 52 and 84. Reversing the augers 20 and mixer 22 moves material 15 away from the feeder 24, thus helping to relieve the jammed condition.

The hydraulic control system 99 also includes a fourth pressure sensor 126 which is used to help prevent stalling or jamming of the hydraulic motor 116 that operates the feeder 24. When the hydraulic pressure reaches a predetermined condition, representative of excessive resistance to movement of the motor 116, the fourth pressure sensor 126 is triggered. This sends an electrical signal to the valve 115 controlling the motor 116 via an electrical cable 127. The signal instructs the valve 115 to either close or reverse the rotation of the motor 116, thus helping to relieve the jammed condition.

Alternative embodiments of the present invention could replace or supplement the hydraulic pressure sensors 120, 122, 124 and 126 with photoelectric sensors or other type of sensor 128 (FIG. 2). In the alternate embodiments, the photoelectric or other type of sensor 128 is used detect the level of material 15 at the rear of the container using light, sound, etc., depending on the type of sensor. The sensor 128 thus provides an indication of the amount of material 15 fed into the augers. This indication is used to control the operation of the moving floor 28 to ensure that the proper amount of material 15 is being fed into the augers 20 and mixer 22.

Figure 8A:
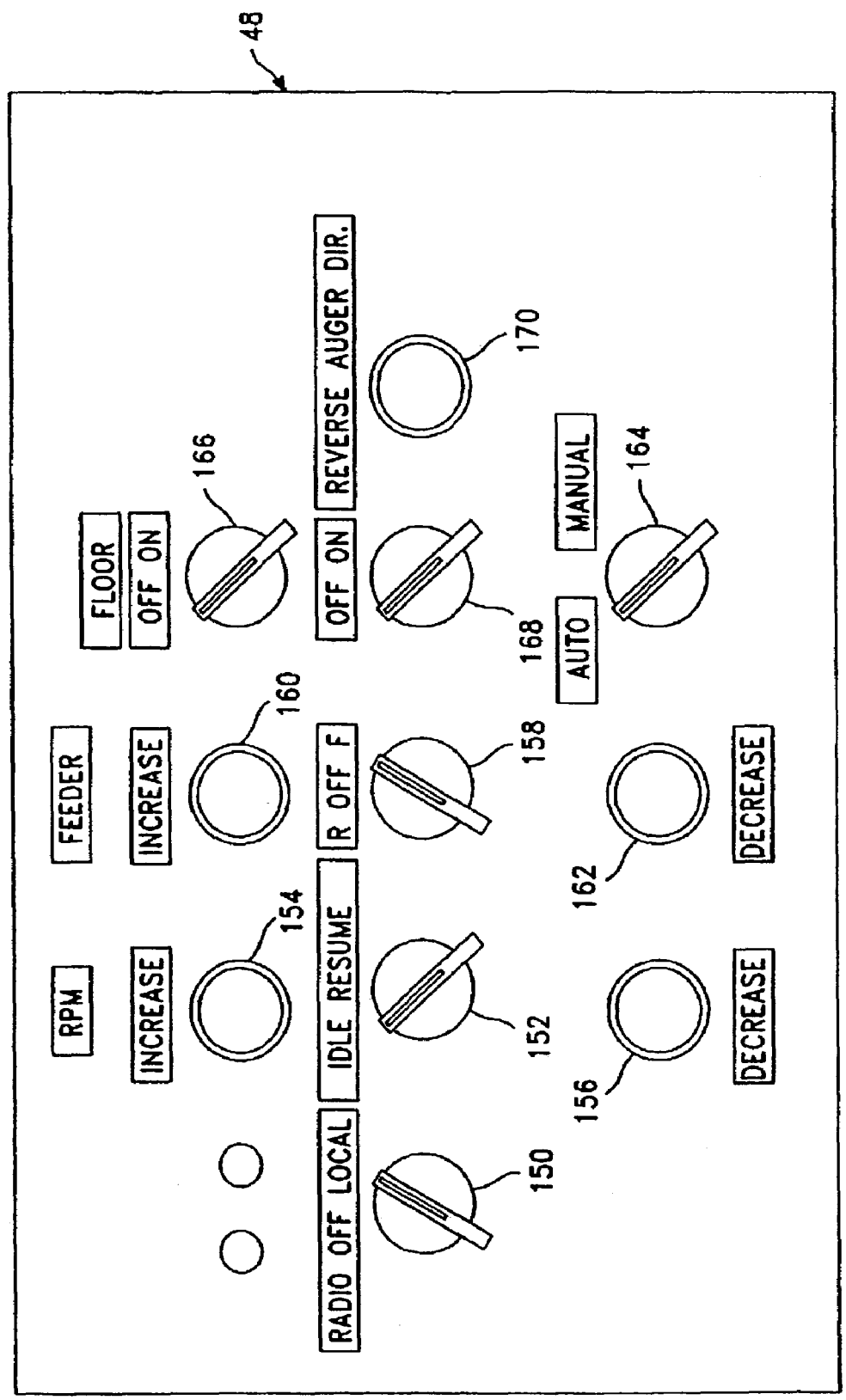
FIG. 8A illustrates one embodiment of the local control panel for controlling the blower and feeder mechanism of the present invention.

An operator controls the operation of the hydraulic control system 99 and the truck engine RPM (or the RPM of remote engine 340) using either the local control panel 48 or remote transmitter control panel 50. The hydraulic control system in turn controls the augers 20, mixer 22, moving floor 28 and feeder 24 as described above. The pumps 102 of the hydraulic control system are operated by a power takeoff from the truck engine in one embodiment. Therefore, the truck engine must be left running during operation. The operator selects whether to control the operation of the truck using the local or remote control panels 48 or 50 by rotating a switch 150 on the local control panel 48 (FIG. 8A). "LOCAL" selects the local control panel 48 while "RADIO" selects the remote control panel 50. As described below, a separate remote mounted engine 340 is provided in an alternative embodiment so that the truck engine can be turned off.

The operator instructs the truck engine to operate at "idle" or at a memorized RPM by selecting either "IDLE" or "RESUME" using switch 152. The RPM of the engine is increased or decreased by depressing buttons 154 or 156, respectively, on the control panel. When the blower 34 is driven by a power takeoff from the engine, increasing or decreasing the engine's RPM increases or decreases the speed at which the blower operates. As the speed of the blower 34 increases or decreases, the movement of air through the mixing chamber 32 increases or decreases. This in turn increases or decreases the distance that material 15 travels upon exiting the free end 44 of the hose 42 and/or the flowrate of material exiting hose 42.

When powering the blower off of the engine of truck 10, it has been found that blower 34 readily produces a consistent air stream of about 18 psig and 1350 scfm. Creating an air stream of about 18 psig and 1350 scfm enables aggregate, which in one instance has an average density of about 2400 lbs./yard$^3$, to be blown for appreciable distances and at appreciable flowrates. For example, given an air stream of 18 psig and 1350 scfm, the system can blow aggregate continuously (e.g., for a half-hour or more) at an average density of 2400 lbs./yard$^3$: (i) a distance of at least eighty feet at a flowrate of at least thirty yards$^3$/hour; (ii) a distance of at least 160 feet at a flowrate of fifteen yards$^3$/hour; and (iii) a distance of at least 270 feet at a flowrate of at least seven yards$^3$/hr. The truck engine driven blowing enables pure sand, having an average density between 2400 to 3000 lbs./yard$^3$, to be blown for similar, suitable appreciable distances and flowrates.

In another embodiment, one or more separate horse-power-producing devices is provided on truck 10 (or railcar or boat, as the case may be) to produce an even more powerful blower 34. As seen in FIG. 1, a separate remote mounted engine 340, e.g., a diesel engine, is provided on the vehicle 10 to produce more power than is available from the engine that drives the truck. In one implementation, engine 340 is a 335 horsepower engine. Engine 340 is mounted inside the trailer of the truck in the illustrated embodiment. A vertical wall (not illustrated) is placed behind engine 340 to separate engine 340 from the area where material 15 is loaded.

Engine 340 in one implementation drives a pair of hydraulic pumps 102 (FIG. 9). One of the pumps 102 runs blower 34 and the other pump runs the other components of the system. In that implementation, one hydraulic pump 102 creates between 2200 to 2800 psig of oil pressure and drives the other components of the system besides blower 34, such as the hydraulic motors 52, the augers 20, the hydraulic motor 84, the mixer 22, the motor 114 that operates moving floor 28 and the motor 116 that operates feeder 24 (FIGS. 2 and 9). That pump 102 also drives a motor 404, which in turn drives a separate additive feeder 424 (FIG. 11).

A separate hydraulic pump 102 is provided to produce about 5800 psig of oil pressure. That oil pressure in turn drives or spins a hydraulic motor mounted to an air compressor, which drives blower 34. The high horsepower engine 340, driving high pressure pump 102, enables even greater flowrates and pressures to be achieved versus running the blower 34 off of the truck engine. It should be appreciated that in another embodiment, the truck engine could be sized to run blower 24 at pressures and flowrates that are achieved via engine 340. The upgraded blower produces a consistent air stream of twenty psig and 2100 scfm and can produce an air stream of twenty-five psig and 2300 scfm.

The feeder 24 is turned off, rotated forward or rotated in reverse by selecting "OFF," "F," or "R," respectively using switch 158. The speed at which the feeder rotates is increased or decreased by depressing buttons 160 or 162, respectively. Increasing or decreasing the speed of the feeder 24 increases or decreases the amount of loose particulate material 15 fed into the mixing chamber 32 and exiting through the hose 44. Changing the direction of rotation of the feeder 24 helps to clear loose particulate material that becomes jammed within the feeder.

The moving floor 28 is operated either manually or automatically by making the appropriate selection using switch 164. If the "MANUAL" option is selected, the floor or moving floor 28 is turned on or off using switch 166. If "AUTO" is selected, the sensors 120 and 122 control the movement of the moving floor 28 as described above. Moving floor 28 is operable in forward reverse directions in one embodiment.

The augers 20 and mixer 22 are turned on or off using switch 168. The direction of the rotation of the augers 20 may be reversed by depressing switch 170. Reversing the direction of the augers 20 helps to clear material 15 from the feeder.

If the operator chooses to operate the truck using the remote control panel 50, switch 150 (FIG. 8A) is set to "RADIO". The operator must also place the moving floor 28 in the automatic or manual mode using switch 164. The control panel 50 is switched on by depressing button 180 (FIG. 7). The control panel 50 includes a low battery indicator 182 and a transmit indicator 184.

The augers 20 and mixer 22 are turned on by depressing switch 168. The blower 34 is started by depressing the run key 190. The operator increases or decreases the RPM of the engine and blower by depressing keys 192 or 194, respectively. The engine may also be set at an idle position in which the blower is shut down by depressing key 196. The moving floor 28 is turned on or off by depressing keys 212 or 214, respectively. Rotation of the feeder 24 is started by depressing key 198. The speed of the feeder 24 is increased or decreased by depressing keys 200 or 202, respectively. The direction of rotation of the feeder 24 is changed between forward and reverse by depressing keys 204 or 206, respectively. The operation of the truck including the moving floor 28, augers 20, mixer 22, feeder 24, blower 34 and the truck engine may be stopped by depressing a kill switch 210.

When operating with either the local or remote control panels 48 or 50, it is advantageous that a water supply be attached to the water valve 96 and the water valve 96 be opened. Whenever the blower 34 and feeder 24 are operating, the control system instructs an electric solenoid water valve (not shown) operatively connected between the water valve 96 and the nozzle 40 to open. This allows water to flow through the nozzle 40 into the air stream produced by the blower 34. The water reduces or eliminates the amount of dust created by blowing material 15, producing a safer environment for the operator. When the blower 34 and feeder 24 are turned off, the control system automatically shuts off the solenoid water valve.

Generally, an operator turns on the augers 20, mixer 22, blower 34, sets the operation of the moving floor 28 to automatic, and attaches a water supply to the water valve 96. The operator adjusts the flow of the material 15 through the hose 42 by adjusting both the speed of the blower 34 and the speed of the feeder 24. Thus, the operator is able to adjust both the amount of material 15 exiting the free end of the hose and the distance that the material 15 travels.

Referring now to FIG. 10, one possible application for the present invention is berm building. A berm 350 of any suitable size and cross-sectional shape is possible via the aggregate, slag or dirt blowing apparatuses and methods of the present invention. FIG. 10, illustrates four trucks or blower systems 352 to 358 that are each contributing to a large berm 350, which is an elongated protrusion from the surface of a section of land. Berm 350 effectively divides the area of land in two and has many practical uses, for example, to block the view of busy roadways from homes bordering such roadways. FIG. 10 is in no way meant to limit the scope of the present invention but instead show the broad application of the pneumatic dispersion of aggregate or dirt to residential, commercial and/or public uses.

In one embodiment, to increase the adhesion of the berm particles and increase the likelihood that the berm holds its shape, water or an organic tackifier is injected into the material 15 before material 15 exits via hose 42. The addition of water to the material 15 has been discussed previously. The addition of a tackifier or other additive is illustrated by additive 415 in association with the supplemental injection system 400 illustrated in FIG. 11.

The location of system 400 is illustrated in FIG. 1 as being between the cab and the tandem axle drive in one embodiment. With system 400, the blower 34 can also be installed in the front of the truck. In the embodiment illustrated in FIG. 11, air from blower 34 receives additive 415 first from feeder 424 and then receives the base material 15 from feeder 24. In an alternative embodiment, air from blower 34 receives base material 15 first from feeder 24 and then receives the additive 415 from feeder 224.

System 400 includes a hopper 402, which for convenience is illustrated in cross-section to show its components and additive 415 held therein. The remainder of the elevation view of FIG. 11 is not illustrated in cross section. Hopper 402 defines a fill spout 432 that enables hopper 402 to be filled with additive 415. Hopper 400 in an embodiment is otherwise sealed to allow pressure that escapes between the rotor blades and barrel walls of additive feeder 424 into hopper 400 to pressurize hopper 402. The pressurization of hopper 402 reduces the pressure differential across the inlet and outlet sides of additive feeder 424.

In one embodiment, the truck engine or the additional engine 340 drives one of the hydraulic pumps 102 described above, which in turn drives a hydraulic motor 404 via hydraulic fluid lines 406. Hydraulic motor 404 in turn drives a gear box 408. Gear box 408 increases the torque outputted by hydraulic motor 404. Output shaft 410 of the gear box 408 mounts inside coupler 412 of the additive feeder 424. Additive feeder includes a pair of couplers 412 as well as a pair of packing glands and seals 414, similar to the packing glands and seals of end plates 316 and 318 illustrated in FIG. 5B. Indeed, additive feeder 424 includes the same components as feeder 24 in FIG. 5B, including a pair of inner wear plates, a pair of barrel sides and a rotor with blades (not illustrated). A shaft and reducing coupling 416 are mounted inside coupler 412 on the opposite side of additive feeder 424 from gear box 408.

A reduced shaft 418 extends from the reduced side of coupling 416 and drives a sprocket 420. Sprocket 420 is coupled via drive chain 422 to a second sprocket 434 mounted to a section of shaft 426 that is part of a mixer 430. Mixer 430 includes shaft 426 and a multitude of mixing rods 428 that extend from shaft 426. Mixing rods 428 churn the additive 415 in a similar manner as does the mixing rods 90 of mixer 22. Mixer 430 and mixing rods 428 help to prevent the additive from clumping and/or bridging over the additive feeder 424. Although the hydraulic motor 404 does not have to drive both the feeder 424 and the mixer 430, it is desirable in one embodiment so as to reduce the overall number of motors on truck 10.

In systems employing the supplemental injection system 400, the output from mixing chamber 32 (shown in FIGS. 5A and 6) feeds into a teed pipe 442 instead of into hose 42. Hose 42 in systems employing the supplemental injection system 400 connects instead to outlet end of teed pipe 442. Additive feeder 424 includes a rotor (not illustrated) that is positioned beneath hopper 402 and above pipe 442. Additive feeder 424 thereby meters and feeds additive 415 from hopper 402. Separate augers are not illustrated in system 400 for pressurizing additive 415 through feeder 424, however, such augers may be provided if needed.

The additive 415 can include any suitable disbursable additive that is desired for a particular application and for a particular material 15. As discussed above, when material 15 is used to build a berm, the additive 415 in one embodiment is a tackifier. Alternatively, additive 14 is one or more types of seed, fertilizer, weed killer or any combination thereof that is injected into a stream of air and organic material 15, such as compost.

In an embodiment, a sensor 440 is mounted to feeder 402 at a desired level to provide a low-feed shut-off feature. In the illustrated embodiment, sensor 440 is a photoelectric or infrared light sensor that includes an emitter portion and a receiver portion. The emitter emits a beam of light and the receiver looks to receive light at a particular frequency or range of frequencies. Sensor 440 has two electrical states, one state when no light from the emitter portion is received by the receiver portion. A second electrical state occurs when the receiver portion senses light from the emitter portion of sensor 440. Those different states correspond to a change in an electrical characteristic, e.g., from either zero to a positive voltage, a positive voltage to zero voltage, etc., as is known in the art.

Sensor 440 is powered via wires 442. Wires 442 also include signal wires that upon energization trip a solid state relay to either allow or disallow power to flow to a device that communicates electrically with sensor 440. The output of the relay in an embodiment controls one and preferably both the hydraulic motors that drive the feeder 24 and additive feeder 424, respectively. The electrical control provided by sensor 440 is converted via a current to pressure (I/P) converter to control the hydraulic oil pressure in lines 406 that feed hydraulic motor 404.

In the illustrated embodiment, additive 415 normally blocks light from emitter portion of sensor 440 from reaching the receiver portion of sensor 440. When the additive 415 falls to a level below the sensor 440, the receiver portion senses the light from emitter portion of sensor 440 and trips the solid state relay. The relay and wires 442 are configured in one preferred embodiment in a "failsafe" manner, so that if the wires 442 or the wires connected to the output side of the relay are removed inadvertently, the controller thinks that a low-feed condition has occurred and shuts down operation of the hydraulic motors.

The low-feed shut-off feature prevents an operator from blowing primary material 15 without receiving a desired amount of additive 415. A suitable alarm can be audibly or visually made either at control panels 48 and 50 or at the remote controller illustrated in FIG. 7.

It should be appreciated that the photoelectric or infrared sensor 440 is but one type of sensor that may be used to trip the low-feed alarm and shut down the feeders 24 and 424 of the present invention. For example, sensor 440 is alternatively a capacitive sensor that mounts through the wall of the hopper 402 and either senses the additive 415 or senses air. The additive 415 creates a change in the magnetic field surrounding a head of the capacitative sensor, causing the electronic state of the sensor to change when the additive 415 is no longer present in proximity to such head.

In a further alternative embodiment, the sensor 440 is a mechanical sensor, for example, including a spring loaded lever arm that extends into the hopper 402. Here, when the additive 415 falls below the lever arm or otherwise cannot overcome the spring force of the lever arm, the lever arm moves causing an electrical contact to either be made or removed. It should be appreciated that other forms of sensing known to those of skill in the art are also possible. In still another embodiment, sensor 440 is an ultrasonic sensor. In still another embodiment, sensor 440 is an ultrasonic sensor.

The supplemental injection system 400 also includes a feature that allows changes in the rotational velocity of the additive feeder to control the rotational velocity of the main feeder 24, or visa versa. For a given application there typically exists a desired ratio of percentages of additive 415 versus material 15 that is blown from the mobile dispensing unit of the present invention. It is desirable to maintain that ratio even when fluctuations in feed rate occur due to, for example, product clumping/bridging, etc. The system 400 includes a feature that maintains such ratio even under changing load conditions via one or both the bulk material 15 or the bulk additive 415.

Either or both the control boxes 48 and 50 or the remote controller of FIG. 7 in an embodiment include a device, such as a touch screen input device, that enables the operator to set a desired ratio of additive 415 to main ingredient 15, for example, by specifying a percent of additive 415. The input can be made on an absolute basis, e.g., the operator inputs the actual percentages, or on a relative basis, e.g., via up/down arrows that decrease the percentage of one of the material 15 or additive 415 and increases the percentage of the other accordingly.

Figure 8B:
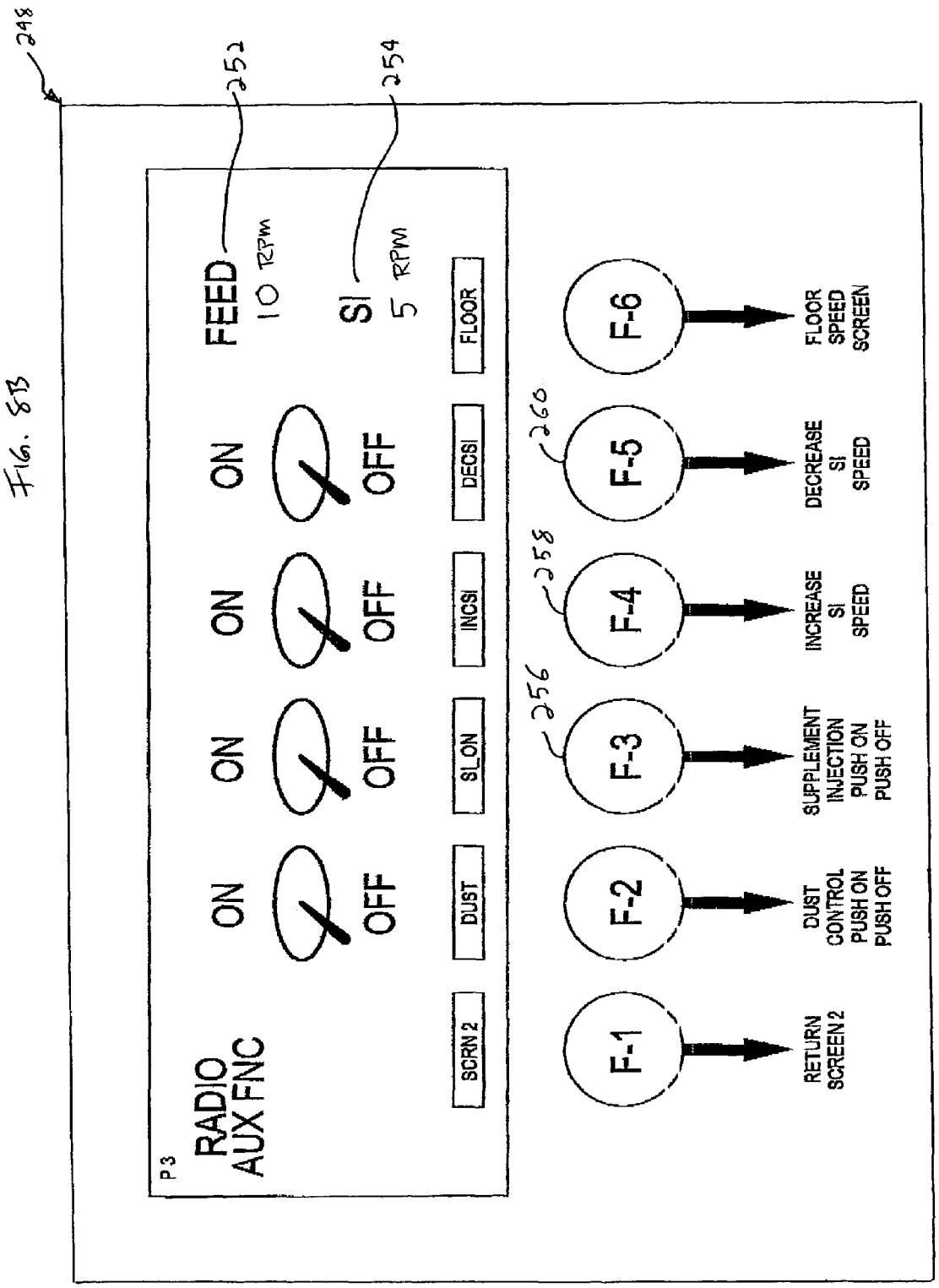
FIG. 8B illustrates another embodiment of the local control panel having a video monitor and input devices for controlling the supplemental injection system of the present invention.

FIG. 8B illustrates one embodiment of a control panel 248. Panel 248 includes a video monitor 250, which is a liquid crystal display in one embodiment. Video monitor illustrates the relative velocity or proportional amount of "FEED" or base material 15 at position 252 and the percent or proportional amount of "SI" or additive 415 at position 254. Among other input devices, control panel 248 includes inputs 256, 258 and 260. Input devices 256 to 260 can be electromechanical as illustrated or an area of a touch screen panel as described above. Input device 256 allows the operator to turn the additive feeder 24 on and off. Input device 258 enables the operator to increase the ratio of the speed of additive feeder 424 relative to the speed of the main feeder 24, so as to increase the proportion of additive 15 relative to material 15. Input device 260 enables the operator to decrease the ratio of the speed of the additive feeder 424 relative to the speed of main feeder 24 to decrease the proportion of additive 415 relative to material 15.

After receiving the inputted percentages of material 15 and additive 415, the controller automatically converts the inputted percentages into a ratio of speeds for the feeders 24 and 424. The controller, knowing the amount of material fed per revolution of the feeders 24 and 424 and the desired ratio of material 15 to additive 415, determines a ratio between the angular velocity of the rotor of the main feeder 24 to the angular velocity of the rotor of the additive feeder 424. Knowing that ratio, the controller controls the velocity of one of the feeder shafts by sensing the velocity of the other feeder shaft. In the illustrated embodiment, the output of the shaft of additive feeder 424 is sensed. In an alternative embodiment, however, the rotational velocity of the main feeder 24 is sensed.

In the illustrated embodiment, reduced shaft 418 couples via a flexible coupler 444 to an encoder 446. As reduced shaft 418 turns, a shaft 448 of the encoder turns in a one to one manner with shaft 418. Encoder 446 is known in the art to produce a number of step pulses per revolution. Those step pulses are transmitted to the controller of truck 10 and are divided by a known amount of time to produce an output indicative of the angular velocity of additive feeder 424. That electrical output is then used in combination with the desired speed ratio to determine a desired output for the rotor shaft of main feeder 424. In that manner, an actual velocity of one of the feeders is used to control the velocity of the shaft of the other feeder, i.e., by controlling the oil pressure to the motor driving that shaft. The ratio of material 15 to additive 415 is thereby maintained despite fluctuations inherent in the feeding systems in the present invention, for example due to overfeeding, under feeding, non-homogeneous portions of the material 15 or additive 415, bridging, clumping and any combination thereof.

The encoder 446 is but one of many ways that the actual output of the rotor of additive feeder 424 can be sensed. In another embodiment, a gear, such as a sixty-tooth gear, is coupled to reduced shaft 418. A sensor, such as a magnetic pick-up is used to sense a change in magnetic field due to the changing proximity of either a tooth or gap between two teeth. The sensor outputs a number of pulses for each revolution of shaft 418 according to the number of teeth on the gear. The pulses are fed to the controller, which converts the pulses to an angular velocity and performs the speed ratio calculation as described above. It should be appreciated by those skilled in the art that other suitable methods for sensing angular velocity of the additive feeder 424 or the main feeder 24 may be employed. As stated above, in an alternative embodiment, the output of the main feeder 24 is sensed and used in a like manner by the controller to control the speed of the rotor inside additive feeder 424.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A method for low pressure dispersing of dense aggregate comprising the steps of:
    moving a container proximate to a destination, the container holding a bulk supply of aggregate having an average density of between 2400 and 3000 lbs./yard³;
    blowing air to create a pressurized air stream having an initial pressure of 18 psig and an initial volume of at least 1350 scfm;
    metering an amount of the aggregate from the container into the pressurized air stream;
    moving the amount of aggregate through a member at a flow rate of 30 yards³/hour so that the aggregate travels a distance of at least 80 feet; and
    manually moving the member to disperse the aggregate to the destination.

2. The method of claim 1, which includes the step of conveying the aggregate within the container to a position for metering the aggregate into the air stream.

3. The method of claim 1, which includes metering an amount of water into the air stream and guiding the air stream, aggregate and water to the destination.

4. The method of claim 1, wherein guiding the air stream includes passing the air stream through a hose.

5. The method of claim 1, wherein the air stream has an initial pressure of at least 20 psig and an initial flowrate of at least 2100 scfm.

6. The method of claim 1, which includes enabling an operator to remotely control the metering of the aggregate.

7. The method of claim 1, which includes adjusting a conveying device automatically if too much or not enough aggregate is being conveyed within the container to a device that meters the aggregate to the air stream.

8. The method of claim 1, wherein guiding the aggregate is performed for a purpose selected from the group consisting of: covering an area of land, filling a cavity in the ground and building a mound on the ground.

9. The method of claim 1, wherein the destination is selected from the group consisting of: an area around a tree or bush, a park, a playground, a schoolyard, a waterway, a roadway or driveway, a parking lot, a rooftop, around railroad tracks and any combination thereof.

10. The method of claim 1, wherein the aggregate includes at least one component selected from the group consisting of: sand, gravel, stone, crushed rock, rolled rock, porous rock, volcanic rock, different sized rock, differently colored rock, riprap rock and any combination thereof.

11. The method of claim 1, wherein the aggregate includes a rock having a maximum size of up to three inches.

12. A method for low pressure dispersing of dence material comprising the steps of:
    moving a container proximate to a destination, the container holding a bulk supply of a material having an average density of between 2400 and 3000 lbs./yard3;
    using a blower motor to create an air stream having an initial pressure of 18 psig at an initial volume of at least 1350 scfm;
    metering an amount of the material from the container into the air stream;
    maintaining the air stream so that the amount of material is blown a distance of at least 80 feet at a flowrate of at least 30 yards³/hour; and
    manually guiding the air stream so that the material is dispersed to the destination.

13. The method of claim 12, wherein the material is selected from the group consisting of: aggregate and slag.

14. The method of claim 12, which includes metering an amount of water into the air stream and guiding the air stream, material and water to the destination.

15. The method of claim 12, which includes injecting at least one additive into the air stream with the material.

16. The method of claim 12, wherein blowing the aggregate is performed for a purpose selected from the group consisting of: covering an area of land, filling a cavity in the ground and building a mound on the ground.

17. The method of claim 12, which includes moving the container by vehicle, railroad car or boat.

18. A method for low pressure dispersing of dense material comprising the steps of:
    moving a container proximate to a destination, the container holding a bulk supply of a material having an average density of between 2400 and 3000 lbs./yard³;
    blowing air to create an air stream having an initial pressure of 18 psig at an initial volume ofat least 1350 scfm;
    metering an amount of the material from the container into the air stream;
    maintaining the air stream so that the material is blown a distance of at least 80 feet at a flow rate of at least 30 yard³/hour; and
    manually guiding the air stream so that the material is dispersed to the destination.

19. The method of claim 18, wherein the material is selected from the group consisting of: aggregate and slag.

20. The method of claim 18, which includes metering an amount of water into the air stream and guiding the air stream, material and water to the destination.

21. The method of claim 18, which includes injecting at least one additive into the air stream and combining the material and additive.

22. The method of claim 18, wherein blowing the aggregate is performed for a purpose selected from the group consisting of: covering an area of land, filling a cavity in the ground and building a mound on the ground.

23. The method of claim 18, which includes moving the container by vehicle, railroad car or boat.

24. The method of claim 1, wherein the air stream has an initial pressure of at least 25 psig and an initial flowrate of at least 2300 scfm.

25. The method of claim 12, wherein the air stream has an initial pressure of at least 20 psig and an initial flowrate of at least 2100 scfm.

26. The method of claim 12, wherein the air stream has an initial pressure of at least 25 psig and an initial flowrate of at least 2300 scfm.

* * * * *